Patented June 7, 1927.

1,631,280

UNITED STATES PATENT OFFICE.

JOSEPH V. MEIGS, OF MONTCLAIR, NEW JERSEY, ASSIGNOR, BY MESNE ASSIGNMENTS, TO CARLETON ELLIS, OF MONTCLAIR, NEW JERSEY.

MANUFACTURE OF PRODUCTS FROM AROMATIC AMINES AND SULPHUR CHLORIDE.

No Drawing. Application filed May 10, 1919. Serial No. 296,057.

This invention relates to a method of producing a reaction product of an amino-aromatic compound with sulphur chloride. The invention is especially concerned with the production of the reaction of sulphur mono- or di-chloride with amino compounds in a concentrated form, as for example in the form of concentrated solutions or as the pure substances themselves. By the reaction of sulphur on the material in a concentrated state, bodies having improved solubility are obtainable.

Among the amino bodies which may be employed in carrying out the present process, simple amines such as aniline, toluidine, xylidine, benzidine and its derivatives, and the like may be mentioned as well as complex mixtures of amino bodies produced by nitrating and reducing coal tar oils and residues, or mixtures, such as may be obtained by the admixture of various simple or complex amino substances. More complicated amino compounds are substances such as phenylene diamine, the amino phenols and cresols as anisidine and the amino compounds of naphthalene such as mono- and di-naphthylamine. These substances may be treated directly with sulphur chloride or they may be reacted upon in solution in a suitable solvent such for example as benzol, toluol, solvent naphtha, gasoline, carbon tetrachloride and the like. In a similar manner the sulphur chloride may be introduced in the form of a solution in one of the solvents as mentioned or any other suitable solvent. Preferably as indicated the reaction is brought about in highly concentrated solutions or with the commercially pure products themselves without dilution with any solvent. In place of the sulphur chlorides mentioned above, sulphur and chlorine may be caused to react with these amino compounds under suitable reacting conditions.

The temperature at which the reaction takes place is of importance in the production of products of the desired degree of solubility. The tendency of higher temperatures is to produce substances which are soluble in oil or hydrocarbon solvents and to some extent in alcohol while reaction at low temperatures, generally speaking, produces products having greater solubility in water. For example when aniline is treated with sulphur chloride in the cold substantially the entire product is soluble in acidulated water. The product produced in this manner appears to retain the basic qualities of aniline to a considerable extent at least and is fairly easily soluble in a dilute solution of hydrochloric acid. The base itself is soluble in alcohol. On the other hand when the reaction is allowed to take place without any special control of temperature, the combination or change is very violent, the mass heats up rapidly and colored vapors are evolved. The product obtained in this manner is much less soluble in acidulated water, scarcely more than 20 to 25% of the product going into aqueous acid solution under these conditions.

The reaction may be effected by bringing the essential reagents together under various conditions. A substance such as aniline may for example be vaporized and the vapors passed into liquid sulphur chloride or brought in contact with the vapors of the latter. In this case the reaction may take place either at an elevated or at a low temperature. For example the vapors of aniline or naphthylamine may be passed into cold liquid sulphur chloride. On the other hand the hot vapors of these amines may be contacted with the hot vapors of sulphur chloride, in this case the reaction is noticeably violent and a product having a low degree of solubility in acidulated water is obtained.

In lieu of treatment in the vapor form the amino compound such for example as aniline is added to liquid sulphur chloride or the latter may be added to the liquid aniline. In this case it is desirable to cool the aniline strongly and add the sulphur chloride very gradually stirring vigorously in order to distribute the chloride thoroughly through the aniline. When the product is in a solid form such for example as naphthalamine it may be powdered and sulphur chloride added thereto. In this case or likewise the reaction mass may be strongly cooled to moderate the violence of the reaction or the naphthylamine may be extended by means of sand or kieselguhr. When it is desired to use solvents as diluting agents it is preferable also to carry out the reaction in the cold although the presence of the solvent if the latter is of a volatile nature tends automatically to restrain extreme local overheating. Ordinarily however, only a relatively small amount of solvent should be employed; under ordinary conditions of operation a volume not in excess of the volume of amino compound employed. Preferably in fact a volume less than one-half the volume of the amino compound taken is desirable. By operating in such concentrated solutions it appears that bodies of higher molecular weight having useful properties are obtainable. In some cases it is possible to use solutions diluted even more than that indicated but it is not desirable with the majority of amino compounds.

The product obtained from many of the amino compounds is sometimes of a complex character and contains bodies of different solubilities. In some cases a portion may be soluble in acidulated water, another portion in an aromatic hydrocarbon such as benzol, and a third portion in alcohol. The extraction with acidulated water yields a material which for the purposes of the present invention may be termed a water-soluble product. In some instances the residue after water extraction is not soluble in either benzol, alcohol or similar solvents and this residue may be useful as an insoluble material. On the other hand other reaction mixtures give as indicated, material soluble in benzol or benzol and alcohol and in order to separate these it is preferable to extract first with benzol and then with alcohol. By this method of successive extraction water-soluble, oil-soluble and spirit-soluble materials are obtained.

As an illustration of a reaction yielding a soluble product the following may be given:

100 parts by volume of aniline are kept cool by surrounding with ice or other suitable freezing mixture. Sulphur chloride is added very slowly with thorough agitation until 30 parts by volume of sulphur chloride have been added to the aniline. The parts, by weight are about 2:1. The resulting product is a deep violet colored solid material of the consistency of a thick paste. This product is practically completely soluble in water containing the requisite amount of acid. It is also soluble to the same extent in alcoholic spirit.

As an example of the production of a product soluble a part of which is soluble hydrocarbon solvents such as benzol, solvent naphtha, gasoline, and the like, and another part of which is soluble in spirit (alcohol), the following is given:

20 parts by weight of alpha-naphthylamine are melted and kept at as low a temperature as possible in the melted state. 4 parts by volume of a mixture of equal parts of sulphur monochloride and toluene (i. e. 3.4 parts by weight of sulfur chloride and 1.7 of toluene) are slowly added to the melted naphthylamine. In this example about 17 parts of sulphur chloride are used per 100 parts of the amino compound, which corresponds to about 6.4 mols. of alpha-naphthylamine to 1 mol. of sulphur monochloride (figured as $S_2Cl_2=135$). The resulting mass is soluble in spirit (i. e. alcohol), and possesses a deep violet color. The product is now given a further heating, this changes the violet material into a greenish product. This green product is composed of two materials, and in this case in substantially equal quantity one of which is soluble in hydrocarbon solvents such as benzol, solvent naphtha and the like and the other portion is soluble in alcohol.

As an example of the different course which the reaction takes when the amine compound is added to an excess of sulphur chloride as compared with the products which are obtained when the sulphur chloride is added to an excess of the amino compound, the following example is given in which the amino compound is added to an excess of sulphur chloride, the amino compound in this case being a liquid, namely, aniline. Add 80 parts by volume of aniline to 100 parts by volume of sulphur chloride (about 1:2 by weight) carrying out the addition very slowly. At this point the reaction mass becomes a stiff paste which is tarry in appearance. Now add 40 parts more by volume of aniline in order to use up the excess of sulphur chloride. By extracting this reaction mass with for example 10% hydrochloric or sulphuric acids it is found that about 60% of the mass is insoluble.

As an example of the results obtained when sulphur chloride is added to a very concentrated solution of an amino compound the following is given:

Make a solution of 20 parts by volume of xylidine in 15 parts by volume of toluene, agitate thoroughly and add slowly 3 parts by volume of sulphur monochloride. The parts by weight would be about 4:1 or about 13:3 mols. Filter the resulting pasty reaction mass and extract with benzol, upon evaporation of the benzol the residue is a reddish-brown oil-soluble material. The residue from the benzol extraction is of a violet color, soluble in methyl, ethyl, propyl and amyl alcohols.

What I claim is:—

1. The process which consists in contacting the sulphur chloride with anilin itself dissolved in a solvent in the form of a concentrated solution while maintaining the mixture cool.

2. The process which comprises adding liquid sulphur chloride gradually to a cooled body of aniline, said aniline being in the free state at the commencement of the operation.

3. A process which comprises reacting upon a mixture of at least two volumes of anilin and one volume of solvent, with sulphur chloride, while preventing the reaction mixture from becoming hot, whereby a solid material is formed.

4. A process which comprises reacting with sulphur chloride upon a free simple amino aromatic compound, while the latter is in a free state and while in the form of a solution of at least 66% strength at the beginning of the operation.

5. A process which comprises slowly adding sulphur chloride to a cold material containing about 6.4 mols. of an amino derivative of an aromatic hydrocarbon, while keeping the reaction mass cool, and continuing the addition of sulphur chloride until not substantially less than 1 mol. of the latter have been added.

6. A process which comprises slowly adding sulphur chloride to a cold material containing an amino derivative of an aromatic hydrocarbon, while keeping the reaction mass cool, and continuing the addition of sulphur chloride until not substantially below 3 mols. of the latter are added per 13 mols. of the amine.

JOSEPH V. MEIGS.